(12) United States Patent
Nerone

(10) Patent No.: US 6,426,570 B1
(45) Date of Patent: Jul. 30, 2002

(54) INCANDESCENT POWER CONVERTER WITH COMPLEMENTARY SWITCHES

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/717,543

(22) Filed: Nov. 21, 2000

Related U.S. Application Data

(60) Provisional application No. 60/203,869, filed on May 12, 2000.

(51) Int. Cl.$^7$ .................................................. B60L 1/14
(52) U.S. Cl. ...................................... 307/10.8; 315/307
(58) Field of Search ........................ 307/10.8; 361/91.2, 361/91.1, 18; 315/307, 308, 82; 363/56.01

(56) References Cited

U.S. PATENT DOCUMENTS 5,449,973 A * 9/1995 Yamashita et al. .......... 307/10.8
6,088,207 A * 7/2000 Sugiura et al. ............. 361/91.2

* cited by examiner

*Primary Examiner*—Shawn Riley
(74) *Attorney, Agent, or Firm*—Fay, Sharpe, Fagan, Minnich & McKee, LLP

(57) ABSTRACT

A d.c.-to-a.c. power converter for supplying low voltage a.c. current to a load circuit that incorporates a low voltage incandescent lamp in an automobile. The converter circuit includes first and second switches 16, 18 serially connected between a bus conductor 28 and a reference conductor 30; being connected together at a common node 42 through which the a.c. current flows and having a shared control node 38. A series circuit including capacitor 60, inductor 58 and inductor 56 is connected between common node 42 and control node 38. The voltage between the control node 38 and the common node 42 determines the conduction state of the associated switch. First and second resistors 70, 72 are serially connected between the bus and reference conductors, with their intermediate node connected to the control node. A third resistor 74 is connected between the common node and one of the bus conductor and the reference conductor. An autotransformer has one end connected to the common node. A capacitor 68 is connected between the reference conductor and the remaining end of the autotransformer. A power converter controller 90, is in operational connection with the power converter circuit 10 to control operation of the power converter when changes in the bus voltage occur.

17 Claims, 4 Drawing Sheets

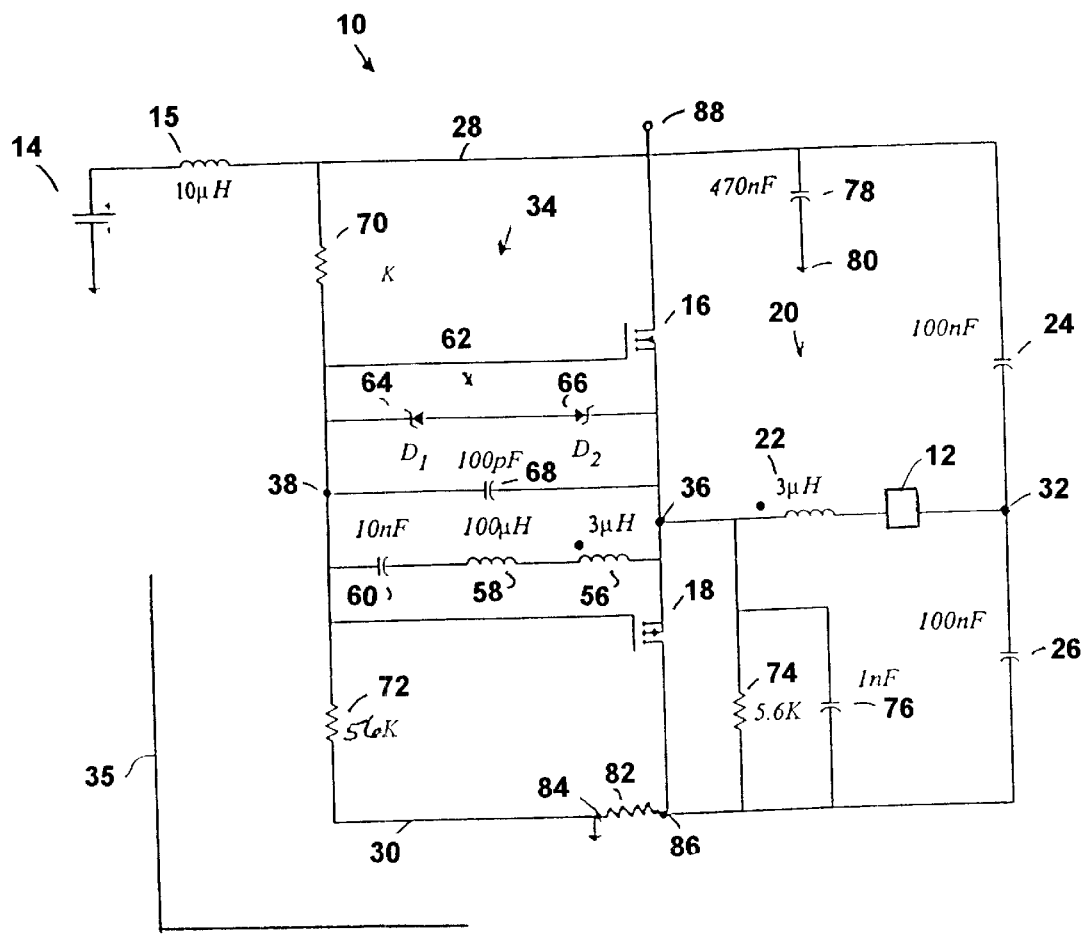
FIGURE 1
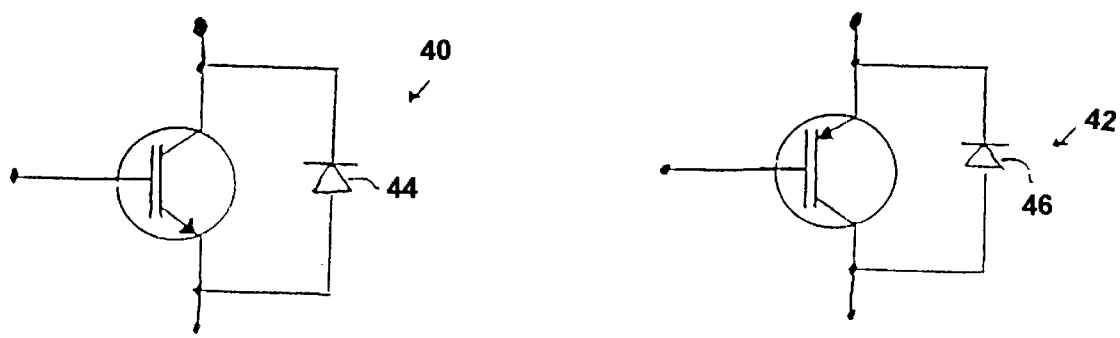
FIGURE 2
FIGURE 3

INCANDESCENT POWER CONVERTER WITH COMPLEMENTARY SWITCHES

I hereby claim the benefit under Title 35, United States Code, section 119(e) of United States Provisional Application Ser. No. 60/203,869 filed May 12, 2000 assigned to the present assignee.

FIELD OF THE INVENTION

The present invention relates to a power converter configuration for low voltage devices, and more particularly to such a converter configuration employing a pair of complementary switches in a d.c.-to-a.c. converter.

BACKGROUND OF THE INVENTION

The existing standard for supplying power to low voltage devices, such as lamps, motors, radios, fans, or heaters, and in particular, such lamps, motors, radios, fans, or heaters in the automotive industry, is from a single 12 volt d.c. power source. Recently, the automotive industry has been moving from the standard 12 volt d.c. power source to a 42 volt d.c. power source. Use of a single 42 volt d.c. power source allows for smaller cabling to be used within the automobile, which in turn allows the automobile to reduce its overall weight, thereby decreasing its fuel consumption. While the industry standard is switching from a 12 v power source to a 42 v power source it has been determined that existing use of 12 v a.c. powered lamps, motors, radios, fans, or heaters may continue to be used in the automotive lighting system. Such lamps may be incandescent lamps or other low voltage lamps used as headlights, rear lights and interior lamps. Low voltage devices have certain advantages, for example, low voltage (12 v) lamps are desirable as they are efficient and ruggedized, as compared to 42 v or other high voltage lamps. It is also known that powering the low voltage lamps with an a.c. source extends the lamp life as compared to powering these lamps with a d.c. source. In a d.c. lamp, tungsten migration and other chemical debilitating processes will take place which decrease the lamp life.

The present invention provides a converter circuit and controller for low voltage devices, that overcome the foregoing drawbacks.

BRIEF SUMMARY OF THE INVENTION

A power converter circuit and controller supply an a.c. signal to a load circuit incorporating a low voltage incandescent lamp. The converter circuit converts supplied 42 volts d.c. to a regulated 12 volt a.c. signal. Included in the circuit are first and second switches serially connected between a bus conductor and a reference conductor. The switches are connected together at a common node through which the a.c. current flows, and at a control node. Also connected between the control node and the common node is a serially connected circuit including a capacitor and two inductors. The voltage between the control node and the common node are used to determine the conduction state of the associated switches, where the time constant of the serially connected circuit determines the frequency of operation.

Also included are first and second resistors connected serially between the bus conductor and the reference conductor and also connected to the control node. A third resistor is connected between the common node and one of the bus conductor and the reference conductor, to set the initial polarity of the control node with reference to the common node. A controller operates to alter the operational frequency of the converter to maintain signal output within a desired range.

BRIEF DESCRIPTION OF THE DRAWINGS

FIG. 1 is a schematic representation of a preferred embodiment of the incandescent d.c. to a.c. converter circuit according to the present invention;

FIGS. 2–5 illustrate alternate switches that can be used in the circuit of FIG. 1;

DETAILED DESCRIPTION OF THE INVENTION

Figures 4, 5:
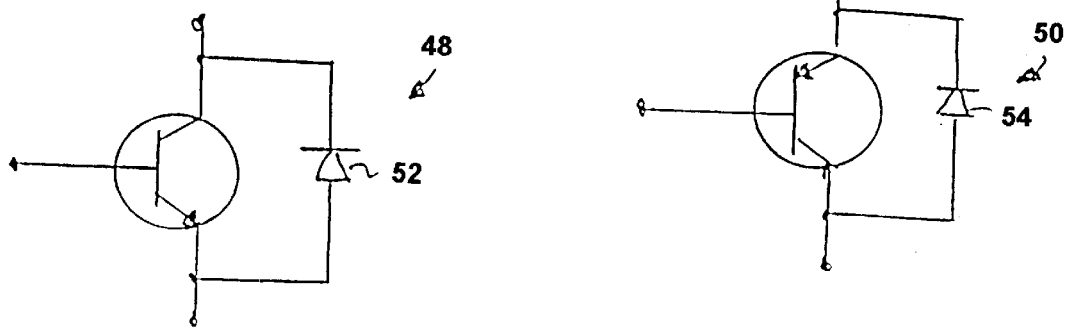

FIG. 1 depicts a d.c. to a.c. power converter circuit 10 to drive a 12 volt, load 12 from a d.c. power source 14 which may be between 30 to 50 volts. Load 12 may be for example a 20 watt halogen lamp, a 12 v motor, a radio, a fan, or heater among other known devices. A smoothing inductor 15 is provided to ensure a smooth d.c. input to the system. Switches 16 and 18 are respectively controlled to convert d.c. current to a.c. current received by a load circuit 20, which in addition to load 12, also includes an inductor/transformer winding 22 and capacitors 24 and 26. A d.c. bus voltage ($v_{bus}$) exists between bus conductor 28 and reference or common conductor 30. Load 12, is connected between transformer winding 22 and node 32, which also connects capacitors 24 and 26. A control circuit 34 is provided, and functions with switches 16, 18 to invert the d.c. supply to an a.c. signal. The power converter circuit 10 and d.c. power source 14 function as a power supply system, which supplies power to load 12. The power supply system and load may all be contained as part of an automotive vehicle 35.

Switches 16 and 18 of FIG. 1 are complementary to each other in the sense, for instance, that switch 16 may be an n-channel enhancement mode device, and switch 16 may be a p-channel enhancement mode device. In one embodiment, each of switches 16 and 18 include an inherent, reverse-conducting diode, not shown.

When embodied as MOSFETs, each switch 16 and 18 has a respective gate, or control terminal. The voltage from the gate to source of switch 16 controls the conduction of that switch. Similarly, the voltage from the gate to source of switch 18 controls the conduction of that switch. As shown, the sources of switches 16 and 18 are connected together at a common node 42. With the gates of switches 16 and 18 interconnected at common control node 42, the single voltage between control node 38 and common node 42 controls the conduction state of both switches 16 and 18. The drains of the switches are connected to bus conductor 28 and reference conductor 30, respectively.

Switches 16 and 18 could alternatively be embodied as Insulated Gate Bipolar Transistor (IGBT) switches, such as the p-channel 40 and n-channel 42 devices respectively shown in FIGS. 2 and 3. However, each IGBT switch would then be accompanied by a reverse-conducting diode 44 or 46. An advantage of IGBTs over MOSFETs is that they typically have a higher voltage rating, enabling circuits with a wide range of d.c. input voltage values to utilize the same IGBTs. Further, switches 16 and 18 could be embodied as Bipolar Junction Transistor (BJT) switches, such as the NPN 48 and PNP 50 devices respectively shown in FIGS. 4 and 5. As with the IGBT switches, the BJT switches of FIGS. 4 and 5 are respectively accompanied by reverse-conducting diodes 52 and 54.

Referring back to FIG. 1, gate drive circuit 34, connected between control node 38 and common node 42, controls the conduction states of switches 16 and 18. Gate drive circuit 34 includes a driving inductor 56 that is mutually coupled to inductor/transformer winding 22, and is connected at one end to common node 42. The end of inductor/transformer winding 22 connected to node 42 may be a tap from the auto-transformer, formed by inductor windings 56 and 22. Inductors 56 and 22 are poled in accordance with the solid dots shown adjacent the symbols for these inductors. Driving inductor 56 provides the driving energy for operation of gate drive circuit 34. A second timing inductor 58 and a timing capacitor 60 are serially connected to the remaining end of driving inductor 56, between node 38 and inductor 56.

A bi-directional voltage clamp 62, comprising Zener diodes 64 and 66, clamps positive and negative excursions of gate-to-source voltage to respective limits determined, e.g., by the voltage ratings of the back-to-back Zener diodes. The bi-directional voltage clamp 62 is desirable where switches 16 and 18 comprise MOSFET or IGBT switches, however, where the switches comprise BJT switches, the bi-directional voltage clamp is not necessary and can be excluded.

A limiting capacitor 68 is preferably provided between nodes 42 and 38 to predictably limit the rate of change of gate-to-source voltage between nodes 42 and 38. This beneficially assures, for instance, a dead time interval in the switching modes of switches 16 and 18 wherein both switches are off between the times of either switch being turned on.

Resistors 70 and 72 are serially connected between bus conductor 28 and reference conductor 30. A third resistor 74 is connected across switch 18 as shown. Resistors 70 and 72 are preferably of equal value if the duty cycles of switches 16 and 18 are equal. In such case, the average voltage during steady state at common node 42 is approximately ½ of bus voltage ($v_{bus}$) at bus conductor 28, and setting the values of resistors 70 and 72 equal results in an average voltage at intermediate or control node 38 also of approximately ½ bus voltage ($v_{bus}$).

Resistor 74 serves as a charging resistor, and is preferably connected between common node 42 and reference conductor 30 as shown in FIG. 1. Resistor 74 may alternately be connected between common node 42 and bus conductor 28. Resistor 74 aids in starting the regenerative control of first and second switches 16 and 18 during initial energization in the following manner.

Upon energizing of source 14, capacitor 60 becomes initially charged via resistors 70, 72 and 74. At substantially the instant source 14 is energized, the voltage across capacitor 60 is zero, and, during the starting process, serially-connected inductors 56 and 58 act essentially as a short circuit due to the relatively long time constant for charging of capacitor 60. It has been found that when resistors 70 and 72 are larger than resistor 74 starting of the circuit improves, as opposed to when all three resistors are of equal value. In one embodiment the ratio between resistors 70 and 72 and resistor 74 may be 10 to 1.

Upon initial bus energization current flows through resistor 70, resistor 72 and the serially connected sequence of capacitor 60, inductor 58, inductor 56 and resistor 74. In this manner, capacitor 60 becomes increasingly charged, from left to right as shown in FIG. 1, until it reaches the threshold voltage of the gate-to-source voltage of upper switch 16 (e.g., 2–3 volts). At this point, upper switch 16 switches into its conduction mode, which then results in current being supplied by that switch to load circuit 20. In turn, the resulting current in the load circuit causes regenerative control of first and second switches 16 and 18 by means of inductive coupling between inductor windings 22 and 56. Output capacitor 76 is connected in parallel to resistor 74. A circuit capacitor 78 is connected between bus 28 and circuit common 80. A sense resistor 82 is inserted within bus 30, which is tied to circuit common 80. Sense resistor 82 has two connection points 84 and 86. A bus connection point 88 is provided in bus 28. The function of sense resistor 82 and connection points 84, 86 and 88 will be discussed in greater detail below.

The frequency of operation in the present invention is determined by the time constant of inductor 58 and capacitor 60, respectively. The frequency of operation of control circuit 34 is, therefore, given by the following formula:

$$f = \frac{1}{2\pi C_t L_g}, \quad (1)$$

where $C_t$ is capacitor 60, and $L_g$ is inductor 58.

The design of inverter 10 dramatically reduces the conducted EMI emissions on the power line.

Further, the present invention satisfies at least five criteria for operating low voltage incandescent lamps as enumerated below:

1. The output voltage is low (e.g., 12 volts).
2. The voltage crest factor is approximately 1, which means the peak output voltage is approximately equal to the rated lamp voltage. In this case, the lamp voltage is rated at 12.8 Vrms This lower crest factor improves the efficiency of the inverter circuit.
3. The inverter does not reduce the life of the lamp.
4. The inverter is short circuit proof.
5. The inverter is inexpensive.

Depending on the time constant of the inductor 22 and the filament resistance of the lamp, the crest factor may vary from 1 to no more than 1.7. Still, keeping this ratio below 2.0 does not deter from the lamp life.

Using the foregoing circuit, a simple, inexpensive d.c.-to-a.c. converter has been described which converts a d.c. 42 volt power source to an a.c. 12 volt signal. In the environment in which the present converter is to be implemented, the power supply may vary from the stated 42 volt d.c. level. For example, a power supply in an automotive setting may range between a 30 volts at a lower charged level, up to 50 volts under lightly loaded conditions. It is desirable that the present circuit provide a substantially constant 12 volt a.c. signal within +/−3%.

Figure 6:
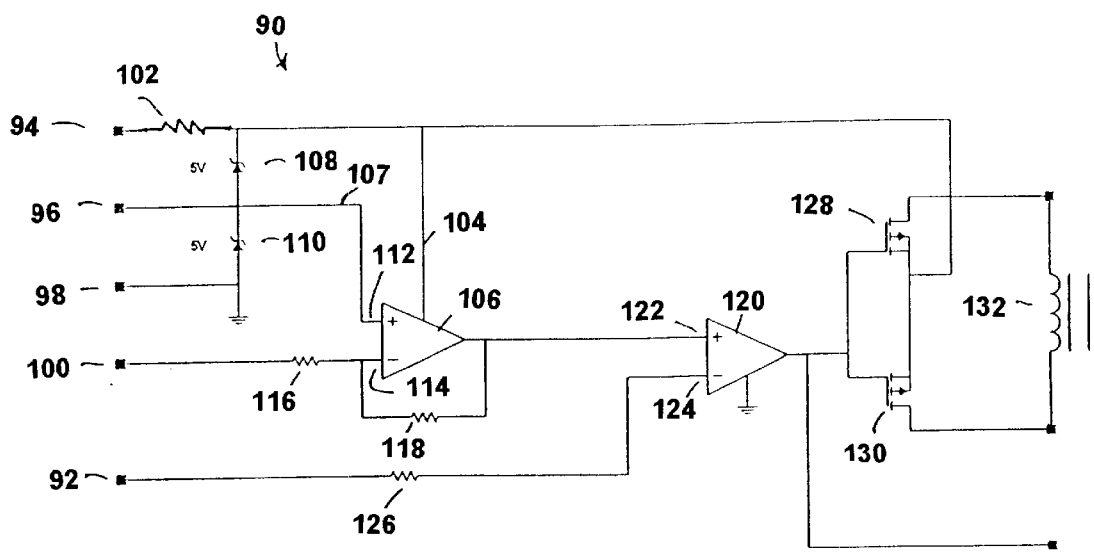
FIG. 6 depicts a controller according to the present invention.

In order to achieve this output, the present invention implements a controller 90 such as shown in FIG. 6. Particularly, since the d.c. source 14 can vary, i.e. from 30 v–42 v, operation of converter 10 needs to be controlled in order to provide a 12 v a.c. output, +/−3%, to supply load 12.

In operation, controller 90 includes a sense input 92 which receives bus voltage obtained from bus current sensed through sense resistor 82. Inputs 94 and 98 sense the bus voltage from bus voltage connecting point 88 with respect to ground. The sensed bus voltage received on input 94 is supplied to controller 90, through a resistor 102, as a supply voltage 104, which is supplied to reference operational amplifier 106 (in one embodiment supply voltage 104 may be a 10 v value supplied to operational amplifier 106). Inputs 94 and 98 use the sensed bus voltage to supply a predetermined reference voltage 107 at input 94, in cooperation with a diode network consisting of diodes 108 and 110, such that the predetermined reference voltage 107 is supplied to an input 112 of reference amplifier 106. The inputs and circuitry associated with inputs 94 through 98 act as a regulator and a reference supply for operational amplifier 106. It is to be appreciated the foregoing is simply one embodiment to provide a reference voltage and supply to an operational amplifier. Other known designs may also achieve the foregoing.

The voltage on input 100, also connected to sense the bus voltage from bus voltage connecting 88, is supplied to a second input 114 of operational amplifier 106 through a voltage divider network consisting of resistors 116 and 118. The output of reference operational amplifier 106 is supplied to an error amplifier 120 having a first input 122, and a second input 124. The output of reference amplifier 106 is supplied to input 122, and the second input 124 is supplied by a signal from input 92 through resistor 126. The output of error amplifier 120 is forwarded to a dual switching network consisting of switches 128 and 130, designed as linear operating amplifiers, which in turn supply inductor winding 132, which is coupled to inductor winding 58 (FIG. 1). Inductor winding 132 and inductor winding 58 are mutually coupled. In designing the present system, a voltage value is sensed from the current value ($i_b$) across resistor 82, and is supplied to input 92. Therefore, the sensed voltage is proportional to the bus current $i_b$ across resistor 82. By knowing the bus current ($i_b$) and the bus voltage ($v_b$), a power set point (p) of the power converter, (such as 10 of FIG. 1) can be determined.

The operation and usefulness of controller 90 may be understood by the following discussion. Assuming the bus voltage is a known set value, e.g. 20 v, and the current flow through the bus is measurable, such as across resistor 82. Using this information, the power of power converter 10 may be found by: $p=i_b*v_b$. Therefore assuming the bus voltage is a set amount, it can be stated that p is proportional to $i_b$. The inverter will therefore be regulating the current in the bus.

With this understanding it may be seen that power controller 90 of FIG. 6 uses an error amplifier 120 to address changes in current. Particularly, since $v_s$ (sensed voltage), is proportional to $i_b$, when $r_s$ (resistance of sense resistor) is fixed, changes in $i_b$ result in changing values on input 92 which are fed to input 124 of error amplifier 120. Assuming a steady set point is being provided on input 122 of error amplifier 120, changes in bus current are addressed. For example, if there is a 20 v bus voltage and it is desired that the power converter delivers 20 watts, and resistor 86 is 1 ohm, then an appropriate set point on input 122 is 1 v. This allows 1 amp of bus current $i_b$ to flow to input 92 resulting in 1 v at input 124. Under this condition, the error amplifier would be operating within appropriate parameters, and the system would be functioning normally. Thereafter, if it was desired to increase the watts output by the power converter to, for example, 40 watts, it would be necessary to increase the set point value at input 122 to 2 v whereby bus current $i_b$ is 2 amps through the 1 ohm resistor 86.

However, use of the error amplifier alone will not address situations where the bus voltage fluctuates. For example, if the bus voltage ($v_b$) moves to 30 v, and the set point value at input 120 was still at 1 v, then 1 amp would be flowing through the 1 ohm resistor, generating 1 volt on input 124. However, as power is found by $p=i_b*v_b$, 30 watts would be provided instead of the desired 20 watts.

Therefore the just described portion of controller 90, does not regulate the system when the bus voltage is changing. To control output under these circumstances, reference operational amplifier 106 is used. Reference amplifier 106 and associated circuitry function to provide an inversion where, as the bus voltage goes up the set point on input 122 decreases. Amplifier 106 measures the bus voltage from point 88 and modifies the set point. Using error amplifier 106, for example, if it was still desired that the power converter 10 provides a 20 watt output, with a 30 v bus voltage the set point value at input 122 is changed from 1 volt to 0.75 volt. Thus, as the bus voltage rises, reference amplifier 106 causes the set point value at input 122 to decrease. In this way the desired wattage output is maintained even when the bus voltage varies. Another optional manner of controlling the set point value, in place of the reference amplifier is use of a multiplier configuration. However, from an economic perspective, use of the error amplifier provides a significant economic advantage. Although use of reference amplifier 106 may not be as accurate as the multiplier, it is capable of generating output values sufficient for its intended use.

Assuming the converter 10 and, controller 90 system was optimally designed to output a 12 v a.c. signal when the d.c. bus is at 42 volts d.c., the exact 12 v a.c. output will change slightly as the 42 v bus varies. This variation will be as a parabolic response, when the voltage varies between 36 v d.c. to 48 v d.c. Without controller 90, the d.c. bus voltage changes by 15%, then the output of the converter 10 would also change by ~15%. However by using controller 90, a 15% change in the bus voltage has been determined to only cause approximately a 3% change in the output of the inverter, i.e. from the ideal 12 volt a.c. output. This results in approximately a five time improvement in the operation of a converter 10 not using controller 90 of FIG. 6.

It is next seen from FIG. 6, that the output from error amplifier 122 is provided to the switching network including transistor switches 128, 130, which in turn supplies inductor 132. Switches 128, 130 may be implemented as components similar to those used for switches 16, 18. Inductor 132 is the primary of an autotransformer whose secondary is inductor 58. By changing the operation of switches 128 and 130, it is possible to alter the frequency of operation of switches 16 and 18 of converter 10. This allows for regulation of the system even as the bus voltage varies. It is noted that switches 128 and 130 operate as a linear switch and function in a manner similar to a variable resistor.

By configuring inductor 132 and inductor 58 as a transformer, there is isolation between the gate and the ground. This allows for all of the circuitry in the system to be referenced to ground.

Figure 7:
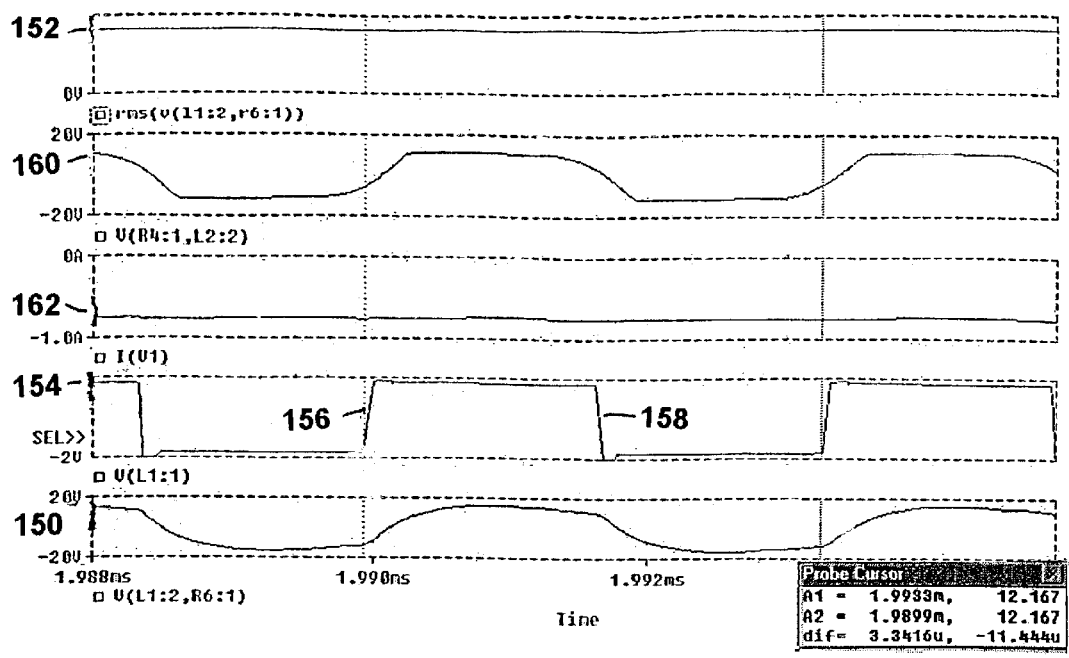
FIGS. 7 and 8 show waveform simulations of a power converter according to an embodiment of the present invention.
Figure 8:
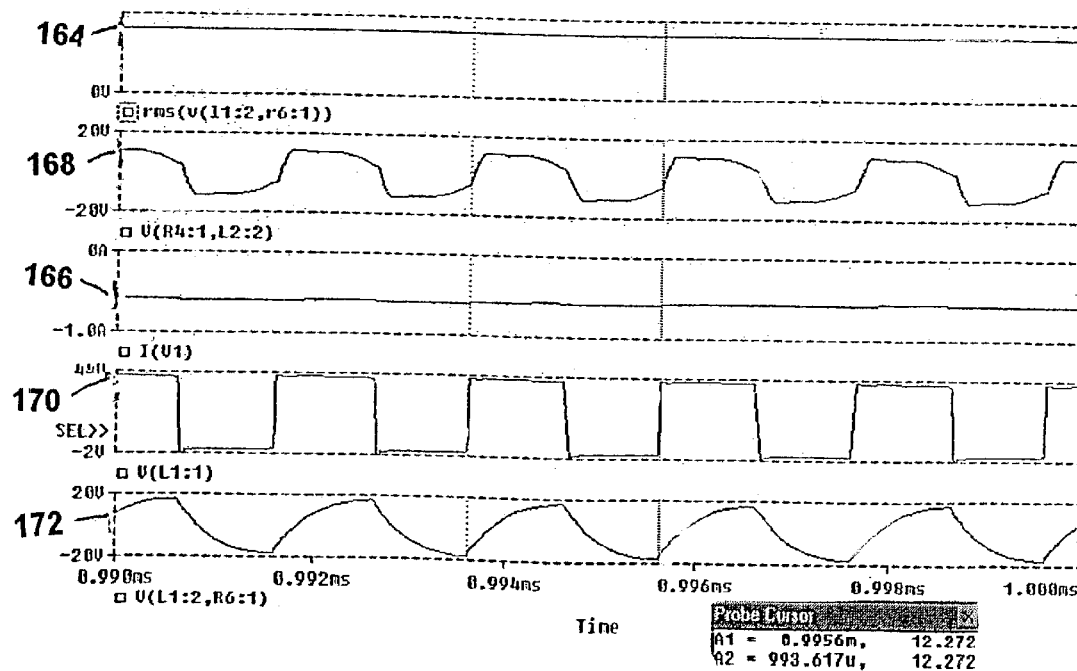

Turning to FIGS. 7 and 8, depicted are waveforms corresponding to simulations of the converter 10 and controller 90 network according to the present invention. In FIG. 7, the simulation was undertaken for a 30 v d.c. bus, powering a load 12 which is a 20 watt MR-16 lamp.

Wave form 150 shows the instantaneous voltage across lamp 12. As can be seen there are smooth edges on the wave form. Wave form 152 illustrates the RMS voltage across lamp 12, which depicts a steady output of approximately 12 volts a.c. (i.e. 12.167 volts a.c.) is obtained when the d.c. bus is at 30 v. Wave form 154 depicts a signal taken at the common midpoint 38 of FIG. 1. At a rise transition 156, both transistor switches 16, 18 are off. Therefore, the inductors are changing the state of the voltages instead of the transistors pushing the voltages up and down. The same action occurs during a fall transition 158. During this fall transition state both transistors are off, which allows for the soft switching.

In FIG. 7, the switching transition interval time constant is approximately 400 nanoseconds, i.e. the L/R (induction/resistance) time constant, where the lamp is approximately 7 ohms of resistance and it is in series with a 3 microhenry inductor. The period of the wave form is about 3.3 microseconds so the frequency is approximately 300 kilohertz. The present invention deals with wave forms which are non-resonant square-type waves.

Wave form 160 is a gate drive wave form. When this wave form goes positive it turns the n-channel gate on, and when it goes negative it turns the p-channel gate on. Wave form 162 represents bus current. Bus current 162 is advantageous over conventional systems due to the smoothness of its signal, which is the current through the voltage source. As can be seen by this wave form, only a minimal amount of filtering of this signal is necessary.

A beneficial aspect of the present invention is that wave form 154 is running somewhat like a square wave, and the current which comes out of the bus is very smooth as shown by wave form 162. Therefore, to find the load current to the load (i.e. lamp 12) all that is necessary is to take the power which is being delivered to a load and divide it by the bus voltage, taking into account efficiencies. Thus, in the present invention the bus current is determined by the power that is going into the load. If the bus voltage is 42 v then this level of current will be very smooth, and this level of current is going to be about ⅓ the load current, regardless of what the load looks like, assuming the efficiencies are close to 1.

Use of the present invention results in the peak voltage or peak current to automatically be reduced by a significant amount. In a device without the smooth input, for example, when one amp is being drawn by the load, there will be one amp pulses on the source, and an equal amount on the cabling. On the other hand, when an amp load is drawn using a system of the present invention, only about a third of an amp would be on the cabling. Essentially, the crest wave factor on the present invention's system is one, whereas pulsing systems could have as a crest wave factor as high as three. The foregoing is emphasized by wave form 162 which shows the very smooth current output (The only reason the current is minus is that in the simulation program all current going out of the source is designated as minus and all incoming is designated as positive).

Turning to FIG. 8, equivalent wave forms to those shown in FIG. 7 are depicted for a 42 v d.c. source, powering a 20 watt, MR-16 lamp. As can be seen, wave form 164 is still the RMS value across the lamp raised slightly to 12.272 v. The waveforms of FIG. 8 emphasize the benefit of using the power controller 90 of FIG. 6, which assists in maintaining the approximate 12 v on the lamp by raising the operational frequency of converter 10.

Where FIG. 7 shows the results of converter 10 running at 300 kilohertz (i.e. the power converter has slowed the frequency down), the wave forms of FIG. 8 are shown for a converter 10 operating at approximately 1 megahertz. FIG. 8 represents a situation where controller 90 has raised the operational frequency of converter 10 to ensure the 12 v output. It is noted that even at this higher frequency, as shown by wave form 166, the d.c. output, comparable to 162 of FIG. 7, is still in a very smooth state. Wave form 168 represents the gate voltage, still sufficient to drive the gate of the switches 16, 18. Wave form 170 which depicts the mid-point voltage, has maintained the square or trapezoidal wave forms but are much smaller due to the increase in frequency. Wave form 172, which is the lamp voltage, shows that this signal becomes more triangular. This formation change is due to the increase in input voltage 166. There is no resonance in the circuit, as it is an L/R circuit design.

Figure 9:
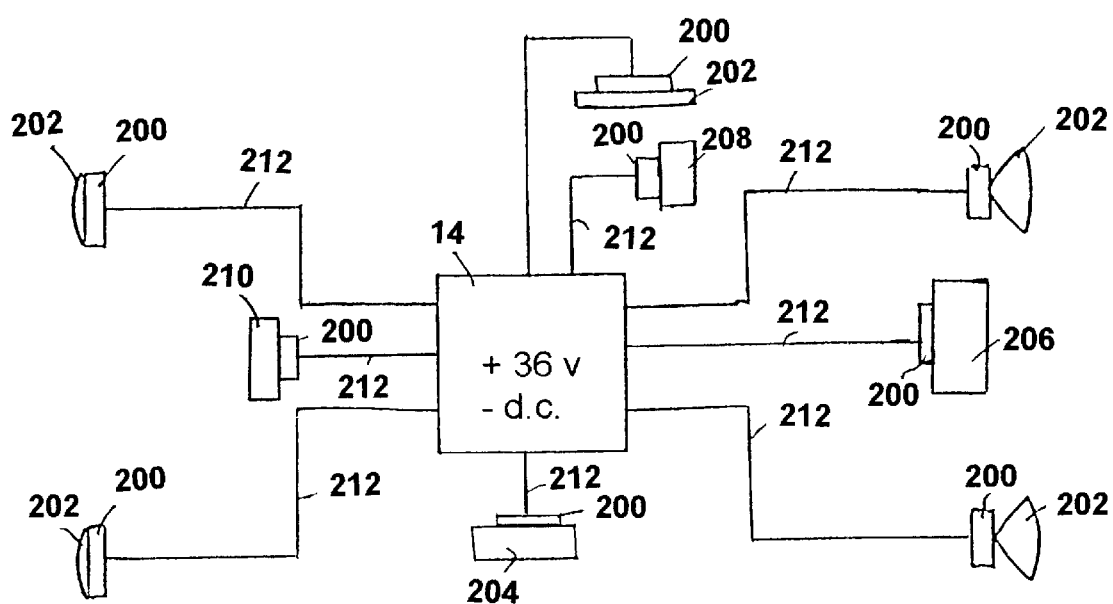
FIG. 9 illustrates a distributed lighting system in which the power converter and controller circuit configured as a single module, may be used.

Turning to FIG. 9, the foregoing described power converter 10 of FIG. 1, used in conjunction with the controller 90 of FIG. 6, may be configured in a modular design. Using such a configuration, converter modules 200 are connected directly to lamps 202, motor 204, radio 206, fan 208 and heater 210 in an automotive environment. The system, as previously noted, is powered by a 42 v d.c. source 14. By this design, cabling 212 may be of a smaller, lighter design than for a 14 v d.c. system. The conversion to 12 v a.c. occurs at the module 200 immediately in connection with a respective lamp 202, motor 204, radio 206, fan 208, and heater 210. Using this design, also provides a benefit of lowering interference along lines 212 while at the same time being able to drive devices 202–210 with a 12 v a.c. signal.

It is to be appreciated that while the foregoing description has concentrated on the automotive industry, the invention is also applicable in a wider range of environments which use a d.c. source to power lower valued a.c. devices.

Thus, the present invention describes a d.c.-to-a.c converter and controller design for driving a load, such as an incandescent lamp from a higher d.c. voltage source by a generated a.c. signal. This low cost method of conversion allows for a reduction in the size of cabling within an automotive setting. It is to be understood that the disclosed power converter may be used as an integral part of a lamp system or as an external power converter.

Exemplary component values for the circuit 10 of FIG. 1 and the controller 90 of FIG. 6 are as follows for a lamp rated at 12 volts and 20 watts, with a d.c. supply of 30–42 volts:

| | |
|---|---|
| Smoothing Inductor (15) | 10 uH |
| Load inductor (22) | 3 uH |
| Turns ratio between (22) and (56) | 1 to 1 |
| Capacitors (24–26) | 100 nanofarads |
| Driving inductor (56) | 3 uH microhenries |
| Timing inductor (58) | 100 nanohenries |
| Timing capacitor (60) | 10 nanofarads |
| Zener diodes (64, 66) each | 5 volts |
| Capacitor (68) | 1 nanofarads |
| Resistors (70, 72) each | 56k ohms |
| Resistor (74) | 5.6k ohms |
| Capacitor (76) | 1 nanofarads |
| Capacitor (78) | 470 nanofarads |
| Resistor (82) | 1k ohms |
| Resistor (102) | 10k ohms |
| Amplifiers (106, 120) each | LMV 358 |
| Zener Diodes (108, 110) each | 54 (145231) |
| Resistor (116) | 10 ohm–50 kohm |
| Resistor (118) | 10 ohm–50 kohm |
| Resistor (126) | 10 ohm–10 kohm |
| Inductor (132) | 100 uH |
| Turns Ratio (58, 132) | 1 to 1 |

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appending claims.

What is claimed is:

1. A power converter configuration comprising:
a power converter circuit including,
   a power source which generates a d.c. bus voltage;
   a gate drive circuit configured to receive the d.c. voltage, the gate drive circuit driving a pair of switches which are controlled to invert the d.c. voltage to an a.c. signal, where the gate drive circuit further includes a driving inductor, timing inductor, and timing capacitor serially connected to each other, and further connected to the switches to control operation of the switches;
   an inductor winding designed to receive the a.c. signal from the switches; and
   a controller in operational connection with the power converter circuit for controlling operation of the power converter circuit.

2. The invention according to claim 1 further including a load which receives the a.c. signal.

3. The invention according to claim 1 wherein the power converter circuit and controller are designed as a single module external of the load.

4. The invention according to claim 2 wherein the load is at least one of a lamp, a motor, a radio, a fan or a heater.

5. The invention according to claim 4 wherein at least one lamp, motor, radio, fan, and heater are powered by an automobile electrical system.

6. The invention according to claim 4 wherein the incandescent lamp is a 12 v, 20 watt incandescent lamp driven by the a.c. signal.

7. The invention according to claim 1 wherein the power source fluctuates between 30 v d.c. and 50 v d.c.

8. The invention according to claim 1 wherein the controller includes,
   an error amplifier designed to control operation of the power converter based on changes of bus current of the power converter; and
   a reference amplifier designed to adjust operation of the power converter based on changes of the bus voltage of the power converter.

9. The invention according to claim 8 wherein the controller further includes,
   a switching network designed to receive an output from the error amplifier; and
   an inductor connected to the switching network and coupled to an inductor of the converter.

10. A power converter system for use in supplying a.c. current, to a load circuit comprising:
   a d.c.-to-a.c. power converter circuit comprising first and second switches serially connected between a bus conductor and a reference conductor being connected together at a common node through which said a.c. current flows and having a shared control node the voltage between said control node and said common node determining the conduction state of the associated switch; the load circuit including,
      an inductor connected between the common node and the lamp; and
      a controller in operational connection with the power converter circuit to control the output of the power converter circuit.

11. The power converter system according to claim 10, wherein the lamp is configured in an automobile.

12. The power converter system of claim 10 wherein:
   the switches are one of MOSFET and IGBT switches; and
   a bi-directional voltage clamp connected between the control node and the common node.

13. The power converter system of claim 11 wherein the bi-directional voltage clamp includes back-to-back Zener diodes.

14. The power converter system of claim 10 wherein the power converter is powered by a power source which fluctuates between 30 v d.c. and 50 v d.c.

15. A power supply system configured to supply power to a load, the power supply system comprising:
   a d.c. power source located within an automotive vehicle, which supplies approximately 30 to 42 d.c. volts;
   a power converter circuit configured to receive the 30 to 50 d.c. volts of the d.c. power source and to convert the 30 to 50 d.c. to a steady a.c. output.

16. The power supply system according to claim 15, wherein the steady a.c. output is 12 v a.c.

17. The power supply system according to claim 15 wherein the steady a.c. output is delivered to a load, which is at least one of a lamp, motor, radio, fan or heater of the automotive vehicle.

* * * * *